United States Patent
Lenick et al.

(10) Patent No.: US 6,840,679 B2
(45) Date of Patent: Jan. 11, 2005

(54) BEARING ASSEMBLY AND LOCKING COLLAR

(75) Inventors: Louis J. Lenick, Mt. Prospect, IL (US); Brian A. Cohen, Wilmette, IL (US)

(73) Assignee: Peer Bearing Company, Waukegan, IL (US)

( * ) Notice: Subject to any disclaimer, the term of this patent is extended or adjusted under 35 U.S.C. 154(b) by 42 days.

(21) Appl. No.: 10/091,779

(22) Filed: Mar. 5, 2002

(65) Prior Publication Data

US 2003/0169954 A1 Sep. 11, 2003

(51) Int. Cl.$^7$ ................................................ F16C 35/63
(52) U.S. Cl. ...................... 384/537; 384/541; 403/290
(58) Field of Search .................. 384/537, 538, 384/540, 541, 542; 403/290, 344

(56) References Cited

U.S. PATENT DOCUMENTS

| | | | |
|---|---|---|---|
| 1,561,443 A | * 11/1925 | Searles | ........................ 384/542 |
| RE17,838 E | 10/1930 | Gayman | |
| 1,821,877 A | * 9/1931 | Bowne | ........................ 384/542 |
| 2,665,930 A | * 1/1954 | Stanley | ........................ 403/350 |
| 3,276,828 A | 10/1966 | Mansfield | |
| 3,304,140 A | 2/1967 | Hornigold | |
| 3,428,379 A | 2/1969 | Readman | |
| RE26,591 E | 5/1969 | Kay | |
| 4,537,519 A | 8/1985 | LaRou et al. | |
| 4,728,202 A | 3/1988 | LaRou | |
| 5,059,053 A | * 10/1991 | Rose | ........................ 403/290 |
| 5,228,787 A | 7/1993 | Lawson | |
| 5,269,607 A | 12/1993 | Lawson | |
| 5,417,500 A | 5/1995 | Martinie | |
| 5,630,671 A | * 5/1997 | Larson | ........................ 403/28 |
| 5,678,949 A | 10/1997 | Swinley | |
| 5,685,650 A | 11/1997 | Martinie et al. | |
| 5,709,483 A | 1/1998 | Martinie | |
| 5,863,137 A | 1/1999 | Johnson et al. | |
| 6,036,372 A | 3/2000 | Okamoto | |
| 6,129,456 A | 10/2000 | Okamoto | |

FOREIGN PATENT DOCUMENTS

GB            960625            6/1964

* cited by examiner

*Primary Examiner*—William C. Joyce
(74) *Attorney, Agent, or Firm*—Cook, Alex, McFarron, Manzo, Cummings & Mehler, Ltd.

(57) ABSTRACT

A bearing assembly comprising an inner ring for mounting on a shaft, an outer ring disposed concentrically about the inner ring, a plurality of roller elements interposed between the inner and outer rings. The inner ring includes fingers which extend axially from a side thereof and terminate in outer annular end walls. A compressible annular locking collar is positioned circumferentially about the fingers. The locking collar has a larger inside diameter and a smaller inside diameter. The larger inside diameter has an axial length not greater than the axial length of the fingers. The larger inside diameter is sized to fit over and engage the fingers. The smaller inside diameter is sized to define an annular radially extending wall which engages the outer annular end walls of the fingers. The locking collar has a fastener screw for causing the larger diameter of the locking collar to compress the fingers into locking engagement with the shaft.

2 Claims, 1 Drawing Sheet

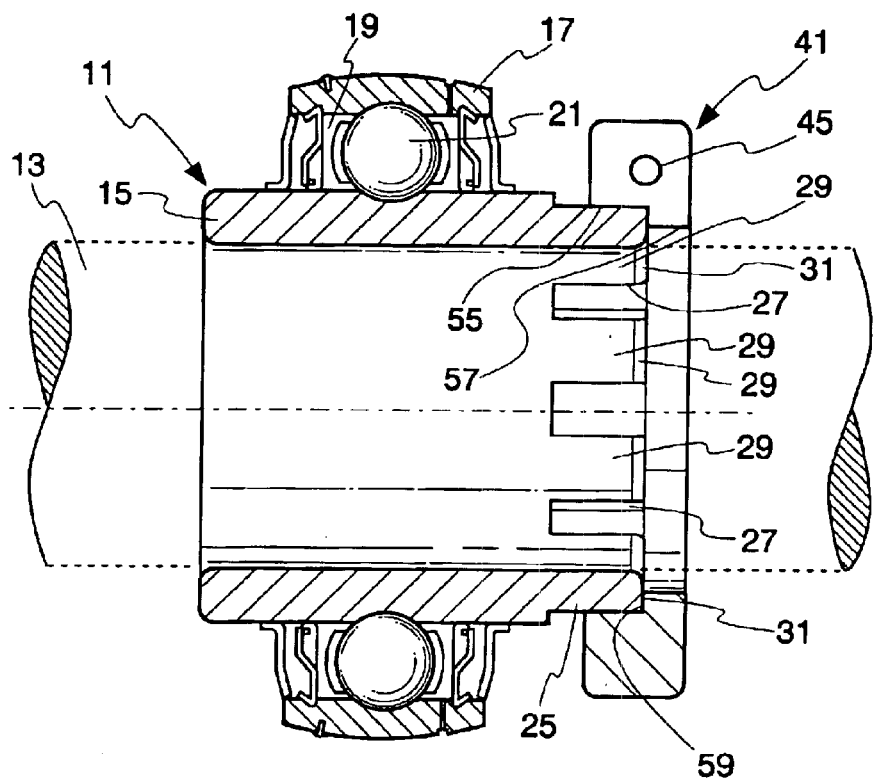
*Fig. 1*
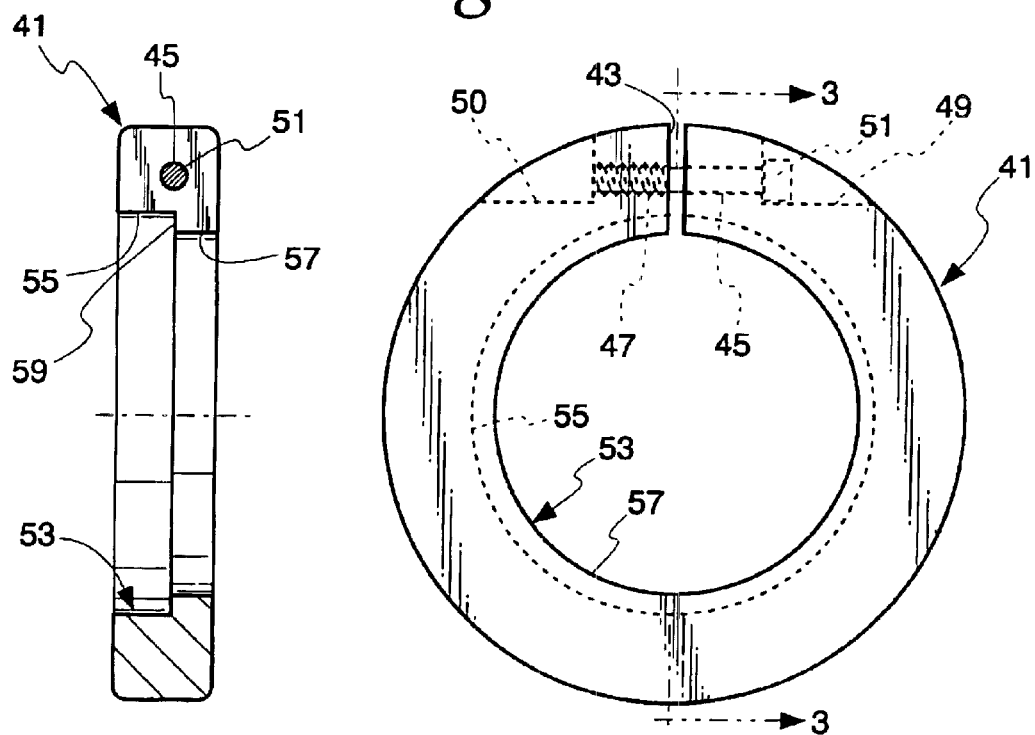
*Fig. 3*  *Fig. 2*

BEARING ASSEMBLY AND LOCKING COLLAR

BACKGROUND OF THE INVENTION

This invention is directed to a bearing assembly of the type which is equipped with a locking collar for mounting on a rotatable shaft. Previous bearing assemblies utilizing locking collars have generated excess noise and vibration or have marred the shaft on which they are installed. In attempts to solve these problems, various approaches have been taken. One approach is to form slotted fingers, or axial extensions, leading from the inner race member of the bearing assembly. These fingers are notched inwardly of their outer ends to form raised end portions on the fingers. The locking collar engages the raised end portions of the fingers thus facilitating bending of the fingers against the shaft when the locking collar is installed and tightened. A disadvantage of this prior construction was the need to machine notches in the fingers which could weaken the fingers to the extent that the fingers would break because of excessive tightening.

Another bearing assembly in the prior art uses unnotched fingers with a locking collar formed with a larger and a smaller internal diameter. The larger internal diameter is positioned over the unnotched fingers but does not contact the fingers while the smaller internal diameter of the locking collar engages the outer ends of the fingers to force the outer ends of the fingers against the shaft when the locking ring is screw tightened. However, this locking collar is susceptible to being incorrectly installed with a reverse orientation on the fingers with the smaller inner diameter positioned at the bases of the fingers where it applies an undesired shear force to the bases of the fingers.

SUMMARY OF THE INVENTION

The present invention provides a bearing assembly and locking collar that accommodates rotatable shafts having irregular diameters while maintaining a high degree of concentricity relative to the rotatable shafts.

An object of this invention is a bearing assembly and locking collar in which the locking collar is formed with a larger inside diameter that engages the outer ends of the inner race member fingers and a smaller diameter which cooperates with the larger inside diameter to form an annular radial wall that engages the distal ends of the fingers of the inner race member. The radial wall limits the overlay of the larger inside diameter relative to the ends of the fingers and positively seats the locking collar relative to the inner race member.

Another object of this invention is a locking collar having a finger engaging inside diameter whose axial length can be varied to adjust the area of gripping contact between the locking collar and the fingers.

Other objects of this invention may be found in the following specification, claims and drawings.

BRIEF DESCRIPTION OF THE DRAWINGS

The invention is illustrated more or less diagrammatically in the following drawings wherein:

FIG. 1 is an axial cross sectional view of the bearing assembly and locking collar of this invention mounted on a shaft shown partially in phantom lines;

FIG. 2 is an end view of the bearing assembly and locking collar of FIG. 1 with the shaft and other parts omitted for clarity of illustration; and FIG. 3 is a cross sectional view of the locking collar of FIG. 2.

DESCRIPTION OF THE PREFERRED EMBODIMENT

The drawings show a bearing assembly 11 mounted on a shaft 13 which is shown in phantom. The bearing assembly 11 includes an annular inner race member 15 surrounded by an outer race member 17 with an annulus 19 defined between the inner and outer race members. Bearing members, in this case ball bearings 21, ride in grooves formed in both the inner and outer race members. As is conventional, the bearing assembly may include a lubricating passage extending through the outer race member. Inner and outer flingers with annular seals may be prepressed between the inner and outer race members to seal the bearing members 21. However, it should be understood and appreciated that the invention may be applied to other types of bearings which do not have lubricating passages or flingers and seals. The inner race member 15 is formed with an axial extension 25 of reduced thickness. Slots 27 formed in this axial extension define fingers 29 which terminate in distal end walls 31.

To secure the bearing assembly 11 to the rotatable shaft 13, a locking collar 41 is provided. The locking collar fits over the axial extension 25 to force the fingers 29 of the axial extension against the rotatable shaft 13 when the collar is tightened. The locking collar is tightenable because of the formation of a diametrically extending gap 43 therein. A smooth passage 45 is formed in the locking collar on one side of the gap 43 and this passage aligns with a threaded passage 47 formed in the locking collar on the opposite side of the gap. A recess 49 to receive the head of a cap screw 51 is formed in the locking collar 41. The cap screw 51 is located in the recess 49 and with its threads extending through the smooth passage 45 and into engagement with the threaded passage 47 to permit tightening of the locking collar through diminution of the gap 43. A recess 50, similar in shape to recess 49, is formed in the locking collar to provide access to the threaded passage 47.

The locking collar 41 is formed with a bore 53 having a larger diameter 55 and a smaller inner diameter 57 separated by an annular radial stop wall 59. The axial length of the larger diameter 55 may be varied to change the amount the locking collar overlies the fingers 29 and thus adjusts the area and location of gripping contact between the locking collar and the fingers.

When the locking collar is positioned over the axially extending fingers 29 of the inner race member 15, the annular radial stop wall 59 engages the distal end walls 31 of the fingers 29 as shown in FIG. 1 of the drawings. The larger outer diameter 55 of the locking collar engages the fingers 29 adjacent the outer ends thereof to press the outer ends of the fingers against the shaft 13. The annular radial stop walls 59 of the locking collar 41 both positions the locking collar on the axial extension 25 of the inner race member 15 but also determine the extended engagement of the locking collar with the outer ends of the fingers 29.

What is claimed is:

1. A bearing assembly comprising an inner ring for mounting on a shaft,
    an outer ring disposed concentrically about said inner ring, a plurality of roller elements interposed between said inner and outer rings, said inner ring including fingers extending axially from a side thereof and terminating in outer annular end walls, a compressible annular locking collar positioned circumferentially about said fingers, said locking collar having a larger inside diameter and a smaller inside diameter, said larger inside diameter having an axial length not greater than the axial length of said fingers, said larger inside diameter sized to fit over and engage said fingers, said smaller inside diameter sized to define an annular, radially extending wall which engages said outer annular end walls of said fingers, and said locking collar having a fastener screw operable for causing said larger diameter of said locking collar to compress said fingers into locking engagement with said shaft.

2. The bearing assembly of claim 1 in which said axial length of said larger inside diameter is less than said axial length of said fingers.

* * * * *